E. L. YALE.
THREAD DISPENSER.
APPLICATION FILED SEPT. 9, 1909.
992,324.
Patented May 16, 1911.
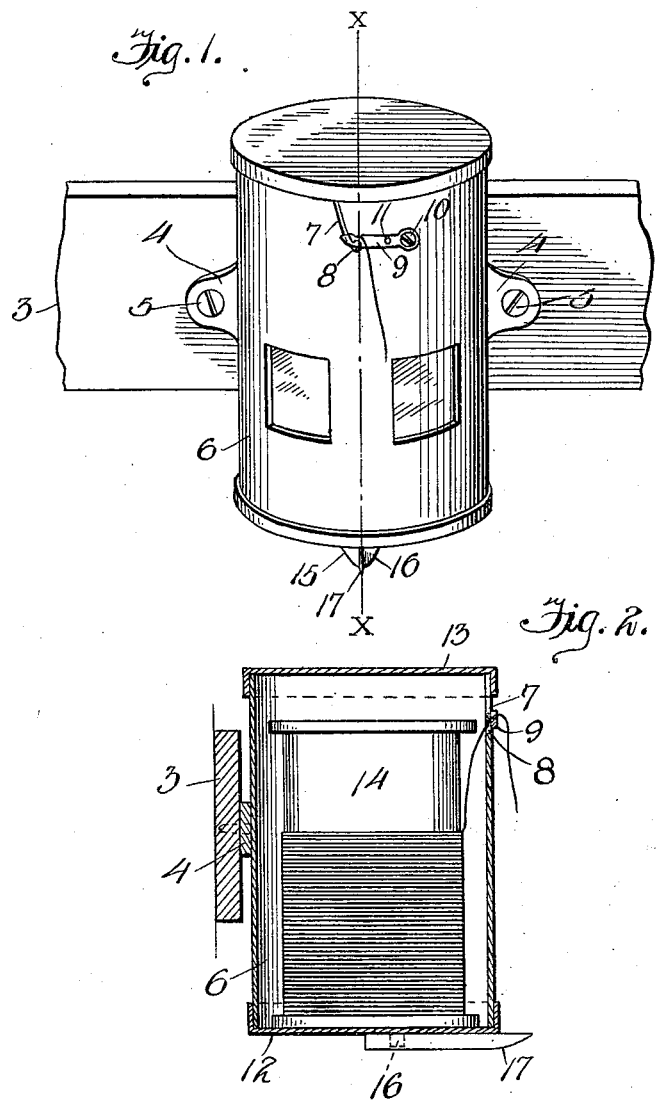
WITNESSES
INVENTOR
Attorney

UNITED STATES PATENT OFFICE.

EDWIN L. YALE, OF LANSING, MICHIGAN.

THREAD-DISPENSER.

992,324.　　　　　Specification of Letters Patent.　　Patented May 16, 1911.

Application filed September 9, 1909.　Serial No. 516,956.

*To all whom it may concern:*

Be it known that I, EDWIN L. YALE, a citizen of the United States of America, and resident of Lansing, in the county of Ingham and State of Michigan, have invented certain new and useful Improvements in Thread-Dispensers, of which the following is a specification.

The invention relates to a spool or thread receptacle.

An object of this invention is to provide an inclosure or casing designed to contain a spool or ball of dental floss or similar material, the said casing having an opening through which an end of the floss may be drawn as the silk is used.

A further object of this invention is to provide novel means for retaining the protruding portion of the silk in certain relation to the opening in the casing, the said retaining device being yieldable to permit the silk to be drawn through the opening when a pull is exerted on the silk sufficient to overcome the friction of the retaining device.

A still further object of this invention is to provide a silk holder having a knife projecting from its bottom, the said knife being secured to the bottom through the medium of braces engaging the sides of the knife which braces prevent lateral movement of the said knife.

Still further objects of the invention are to provide a novel, practical means of removing the knife for sharpening; to provide a novel attaching element for securing the receptacle to some fixed object; and to provide a quickly operated and convenient means of rethreading the receptacle.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 illustrates a view in perspective of a spool or thread receptacle embodying the invention; and Fig. 2 illustrates a sectional view on the line $x$—$x$, Fig. 1. Fig. 3 is a detail view, showing the relative positions of the slot, 7, and the opening 8.

In these drawings 3 denotes any fixed object to which the casing may be attached through the medium of the strip 4 having openings in its ends for the reception of the securing devices 5, such as screws. The casing or receptacle 6 is here shown as cylindrical although its configuration may be varied, and I do not, therefore, wish to be limited with respect to the size or shape of the said receptacle.

A diagonally disposed slot 7 extends from the upper edge of the receptacle and terminates in an enlarged opening 8, the upper wall of which extends above the end of the slot. The casing is provided with a strip 9, of resilient material having one end secured to the casing in any suitable manner as by a screw 10 and pin 11, or otherwise, the means for fastening the said strip being an immaterial detail of construction which may be varied to suit the manufacturer.

The receptacle or casing is provided with a bottom 12, and a top or cover 13, the latter of which is removable for the purpose of permitting the application of a spool 14, containing the silk. The bottom 12 has two opposing lugs 15 and 16, between which a knife 17 is anchored, the said knife having its end projecting beyond the side of the receptacle and adapted to act on the silk drawn from the receptacle, in order that said silk may be severed into appropriate lengths at the will of the user. The knife is slightly tapered, being thinner adjacent to the protruding end, so that it may be forcibly wedged between the lugs, which hold it with sufficient firmness to withstand the pressure of the thread upon the edge, but may be easily withdrawn when necessity requires.

The relation of parts just described is shown in Fig. 2, wherein the silk is shown as being held between the strip and the outer wall of the receptacle, and in Fig. 3, wherein the lip 7' is disclosed; the purpose of this lip being to retain the thread in the opening 8, and in proper relation to the resilient member 9, said relation being quickly and easily obtained in the operation of rethreading, by drawing the disengaged portion outward from the interior of the receptacle, thence downward through the slot and under the member 9, until the thread lies within the opening 8, and is then brought upward under the member 9, and is prevented from returning into the slot 7, by engaging with the lip 7', and is thus retained between the resilient member and the wall of the receptacle. The resiliency of the part 9 just mentioned, will be sufficient to prevent unwinding of the silk from the spool until a sufficient pull is exerted on the silk to overcome the said resiliency, or to draw the strip outwardly until there is sufficient space between said strip and said receptacle when, of course, the silk will be free to pass out of the receptacle or casing. When a required amount has been drawn from the receptacle, the silk may be placed in contact with the knife and cut into the length required by the operator.

If desirable, I may provide the receptacle with transparent panels such as glass, mica or celluloid shown at 18 for the purpose of observing the supply contained in the receptacle.

By the term "silk" heretofore used in the specification, I wish to be understood as meaning, thread, dental floss, string or like material.

I claim:

In a thread dispenser, a casing having anchoring means thereon, said casing having a slot in its upper periphery, said casing having an aperture communicating with said slot, a resilient member adjacent the upper portion of said aperture, said resilient member having a notch in its upper edge to prevent lateral movement of the thread, and a lip intervening between the lower end of said slot and the upper portion of said aperture.

In testimony whereof, I have affixed my signature in the presence of two witnesses.

EDWIN L. YALE.

Witnesses:
GEORGE VAUGHAN,
JOHN I. CARPENTER.

Copies of this patent may be obtained for five cents each, by addressing the "Commissioner of Patents, Washington, D. C."